United States Patent [19]

Kinugawa et al.

[11] 4,306,527

[45] Dec. 22, 1981

[54] METHOD AND APPARATUS FOR CONTROLLING ENGINE ROTATIONAL SPEED

[75] Inventors: Masumi Kinugawa; Motoharu Sueishi, both of Kariya, Japan

[73] Assignee: Nippondenso Co., Ltd., Kariya, Japan

[21] Appl. No.: 108,705

[22] Filed: Dec. 31, 1979

[30] Foreign Application Priority Data

Jan. 26, 1979 [JP] Japan .................................. 54/8577

[51] Int. Cl.³ .......................... F02D 1/04; F02D 9/00; B60K 31/00; F02M 23/04

[52] U.S. Cl. .................................... 123/339; 123/327; 123/352

[58] Field of Search ............... 123/339, 340, 351, 352, 123/353, 354, 355, 585, 587, 327, 328, 343

[56] References Cited

U.S. PATENT DOCUMENTS 3,645,241 2/1972 Huntzinger ........................ 123/352
3,648,798 3/1972 Jania .................................. 123/352
3,661,131 5/1972 Croft .................................. 123/339
3,868,933 3/1975 Bigalke et al. ...................... 123/339
3,885,644 5/1975 Seidler et al. ...................... 123/352
4,014,169 3/1977 Umino ................................ 123/327
4,108,127 8/1978 Chapin et al. ...................... 123/339
4,192,278 3/1980 Iizuka et al. ........................ 123/327
4,194,477 3/1980 Sugiyama .......................... 123/327

*Primary Examiner*—Raymond A. Nelli
*Attorney, Agent, or Firm*—Cushman, Darby & Cushman

[57] ABSTRACT

A method for controlling the rotational speed of a combustion engine which drives an automotive vehicle by computing the actual and desired values of the idle rotational speed of the engine, computing a control amount corresponding to the difference between the actual and desired values and controlling the amount of air or the amount of mixture supplied to the engine in accordance with the control amount. The desired value and the upper and lower limit values of the control amount are changed in accordance with a plurality of operating parameters including the condition of a brake switch.

4 Claims, 7 Drawing Figures

METHOD AND APPARATUS FOR CONTROLLING ENGINE ROTATIONAL SPEED

BACKGROUND OF THE INVENTION

This invention relates to a method and apparatus for controlling the idle rotational speed of engines for driving automotive vehicles.

A known closed loop control method attempts to make the adjustment of the idle rotational speed of an automobile engine maintenance-free or to control the idle rotational speed so as to maintain a desired design value. When a throttle valve is closed, the deviation or difference between the actual idle rotational speed and the desired value is determined and the amount of air flow or the supply of mixture to the engine is controlled in accordance with the difference.

A disadvantage of this known control method is that no consideration is given to the compensation of a signal indicative of the desired value of the idle rotational speed for any automobile operating condition parameters. Consequently the closed loop control is always accomplished when the engine throttle valve is closed. As a result, a difficulty occurs when the vehicle is run while operating the engine at around the idle rotational speed, such as when the vehicle is run at a very low speed or when the foot brake is applied during the running of the vehicle to decelerate it. More specifically, since, in such a condition, the engine temperature has risen sufficiently and the warming-up of the engine has been completed so that the engine load, such as the viscosity resistance of the engine oil is decreased as compared with that at the idling operation during the warming-up period. If the desired value for the idle rotational speed is not compensated for changes occurring in the engine operating condition parameters, under such a running condition there is the danger of the engine rotational speed increasing abnormally against the will of the driver and causing a feeling of unpleasantness on the part of the driver.

Another disadvantage is that if, for example, any fault occurs in a rotational speed sensor for sensing the engine rotational speed, there is the possibility that the control amount computed in accordance with the sensor output signal will assume a value which is quite remote from a predetermined control range. Since this type of known control method sets no range of limits to the computed control amount, there is a disadvantage that during the running of an automobile there is the danger of the engine rotational speed varying abnormally against the will of the driver and causing a feeling of unpleasantness on the part of the driver.

SUMMARY OF THE INVENTION

With a view to overcoming the foregoing defficiencies in the prior art, it is the object of the invention to provide a method and apparatus so designed that the rotational speed of an automobile engine can be controlled suitably even during the running of the automobile with the engine being operated at around the idle rotational speed.

Particularly, the invention features the fact that the control amount corresponding to the deviation or difference between the desired value and the actual engine rotational speed is limited to a control range between an upper limit value and a lower limit value and the control range as well as the desired value are varied in accordance with the operating parameters of the automobile.

DESCRIPTION OF THE PREFERRED EMBODIMENTS

An apparatus for performing a control method according to this invention will now be described with reference to the illustrated embodiments.

Figure 1:
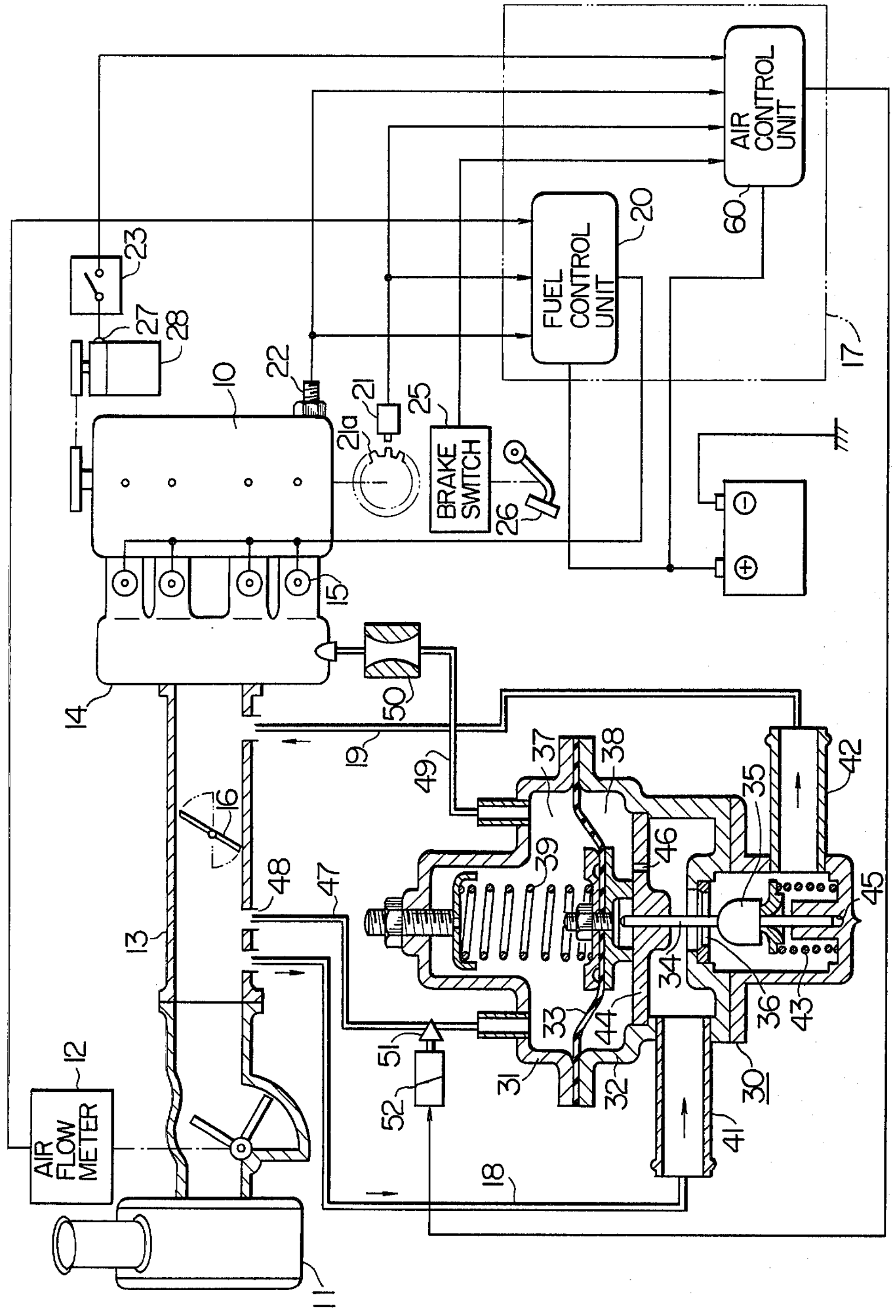
FIG. 1 is a schematic diagram showing an embodiment of the invention.

Referring first to FIG. 1 showing an embodiment of the apparatus, an engine 10 is a known type of four-cycle spark ignition engine for driving an automotive vehicle by the combustion of an air-fuel mixture, and the engine 10 is designed so that primary air is drawn by way of an air cleaner 11, an air flow meter 12, an intake pipe 13 and an intake manifold 14 and fuel such as gasoline is injected and supplied from a plurality of electromagnetic fuel injection valves 15 mounted in the intake manifold 14.

The amount of primary air flow to the engine 10 is adjusted by a throttle valve 16 which is operated as desired from an accelerator pedal which is not shown. A fuel control unit 20 is of a known type which utilizes the rotational speed N detected by an electromagnetic pickup 21 constituting a rotational speed sensor and the sucked air quantity Q measured by the air flow meter 12 as basic parameters so as to determine a basic fuel injection quantity $\tau$($\tau = k \cdot Q/N$, where k is a constant) and the unit 20 also receives the output signal of a warm-up sensor 22 for sensing the engine cooling water temperature, thereby computing a final fuel injection quantity$\tau'$($\tau' = k' \cdot \tau$, where k' is a temperature dependence coefficient).

Air pipes 18 and 19 are arranged to bypass the throttle valve 16, and an air control valve 30 is disposed between the pipes 18 and 19. One end of the pipe 18 is connected to an air inlet port provided between the throttle valve 16 and the air flow meter 12 and one end of the pipe 19 is connected to an air outlet port provided downstream of the throttle valve 16.

The air control valve 30 is a diaphragm type control valve in which the outer periphery of a diaphragm 33 is held between housings 31 and 32 and the oscillation of the diaphragm 33 is transmitted to a valve member 35 fixedly mounted on a shaft 34 to open and close a valve seat 36. The diaphragm 33 is displaced by the pressure difference between a diaphragm chamber 37 and an atmospheric chamber 38 and the diaphragm 33 is also biased by a compression coil spring 39 to apply a valve opening force to the valve member 35.

Basically the valve member 35 comprises a needle valve and the flow passage area defined by the valve member 35 and the valve seat 36 is continuously varied in response to the displacement of the diaphragm 33 or the pressure in the chamber 37 so as to adjust the amount of air flowing from an inlet pipe 41 to an outlet pipe 42. The valve member 35 is disposed reverse to the ordinary needle valve and a valve closing force is applied to the valve member 35 by a relatively weak compression coil spring 43.

Since the valve member 35 is disposed reverse to the ordinary needle valve, the valve member 35 is opened when the pressure in the chamber 37 increases (approaches the atmospheric pressure) and the valve member 35 is closed when the pressure in the chamber 37 decreases (approaches the vacuum). It is also arranged so that assuming that the amount of lift (displacement) of the valve member 35 is zero at the wide open position shown in FIG. 1, the air quantity Q varies exponentially with the amount of lift L upwards in the illustration.

A holding plate 44 is fixedly attached to the housing 32 and the shaft 34 is guided by the holding plate 44 and a bottom supporting hole 45. The holding plate 44 is also formed with a small hole 46 and the atmospheric air is introduced into the atmospheric chamber 38 through the small hole 46.

The diaphragm chamber 37 is connected through a tube 47 to a port 48 disposed upstream of the throttle valve 16 so as to introduce the atmospheric pressure and the chamber 37 is also connected through a tube 49 and an orifice 50 to the intake manifold 14 downstream of the throttle valve 16 so as to introduce the vacuum. An on-off type electromagnetic valve 51 is mounted in the tube 47 so as to open and close the tube 47 and thereby to control the pressure in the diaphragm chamber 37.

The electromagnetic valve 51 constitutes an electromagnetic mechanism for controlling the opening of the air control valve 30 and it is connected to an air control unit 60 of a computer 17 so as to control the energization of an electromagnetic coil 52.

The air control unit 60 is connected to the electromagnetic pickup 21, the engine warm-up sensor 22, an air conditioner switch 23 for an air conditioner such as a car cooler and a brake switch 25 to receive an engine rotational speed signal, cooling water temperature signal, air conditioner ON-state and OFF-stage signals and brake ON-state and OFF-state signals.

The electromagnetic pickup 21 is disposed to face a ring gear 21*a* which is rotated in synchronism with the crankshaft of the engine 10 so as to generate a pulse signal of a frequency proportional to the engine rotational speed. The engine warm-up sensor 22 comprises a temperature sensitive device such as a thermistor so as to detect a temperature indicative of the engine temperature, such as the engine cooling water temperature.

When the air conditioner switch 23 is turned on, an electromagnetic clutch 27 is coupled and an air conditioner compressor 28 is coupled as a load of the engine 10. The brake switch 25 is one which is turned on in response to the depression of a vehicle foot brake 26.

Figure 2:
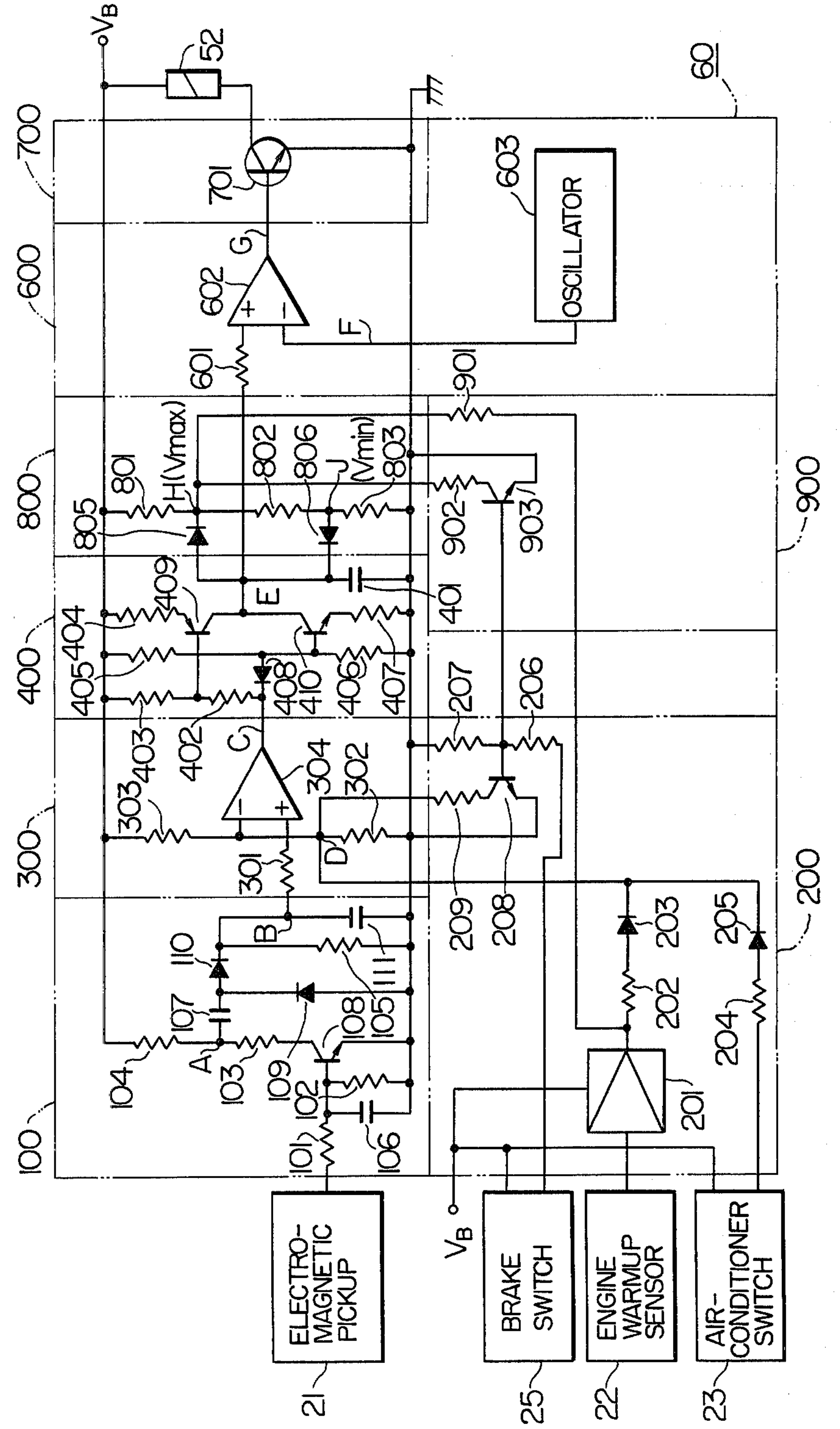
FIG. 2 is a circuit diagram for the air control unit shown in FIG. 1.

The air control unit 60 of the computer 17 shown in FIG. 2 will now be described in detail with reference to the waveforms shown in FIG. 3. The electromagnetic pickup 21 applies to a digital-to-analog (D/A) converter 100 a signal having a frequency proportional to the engine rotational speed, so that the signal is reshaped into a waveform such as is shown in (a) of FIG. 3 by waveform reshaping means comprising resistors 101, 102, 103 and 104, a capacitor 106 and a transistor 108 and the reshaped signal is generated from a terminal A. The signal is then converted by capacitors 107 and 111, diodes 109 and 110 and a resistor 105 into the voltage shown in (b) of FIG. 3 consisting of a sawtooth voltage synchronized with the engine rotational angle and having superimposed thereon a voltage proportional to the actual engine rotational speed and the voltage is generated from a terminal B.

A function voltage generating circuit 200 receives the output signal of the warm-up sensor 22, the On-state and OFF-state signals from the air conditioner switch 23 and the ON-state and OFF-state signals from the brake switch 25. Of these signals, the output signal of the warm-up sensor 22 is amplified by an amplifier circuit 201 of the known type into a voltage signal corresponding to the engine warming-up condition. This voltage signal and the ON- or OFF-state signal from the air conditioner switch 23 are respectively applied through a resistor 202 and a diode 203 and through a resistor 204 and a diode 205 to a comparison circuit 300 which will be described later and in this way a comparison level $V_D$ is applied to the comparison circuit 300.

The ON or OFF signal from the brake switch 25 is first subjected to voltage division through resistors 206 and 207 and then applied to a transistor 208 so as to turn the transistor 208 on or off and thereby to control the connection of a resistor 209 to a terminal D.

Figure 4:
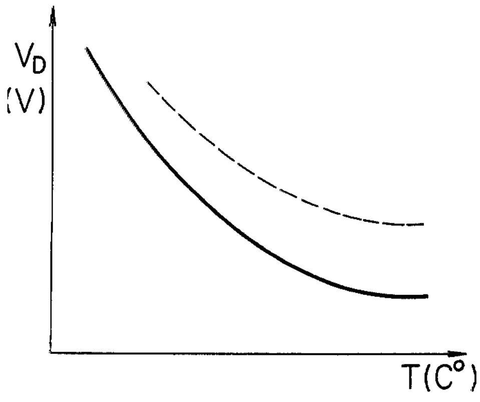
FIGS. 4 and 5 are characteristic diagrams useful for explaining the operation of the apparatus shown in FIG. 1.

The function voltage generating circuit 200 is provided to vary the comparison level $V_D$ indicative of a desired value for the idle rotational speed and its output characteristic is designed as shown in FIG. 4 so that when the engine temperature or cooling water temperature T increases, the comparison level $V_D$ is decreased, whereas when the air conditioner switch 23 is turned off the comparison level $V_D$ is changed to a lower level as shown by the solid line and when the air conditioner switch 23 is turned on the comparison level $V_D$ is changed to a higher level as shown by the broken line.

Similarly, when the brake switch 25 is turned on so that the brakes are applied, the transistor 208 is turned on and the comparison level $V_D$ shown by the solid line or the dot-and-dash line is decreased by a predetermined level.

The comparison circuit 300 comprises resistors 301, 302 and 303 and a comparator 304, whereby the output voltage of the D/A conversion circuit 100 indicative of the actual idle rotational speed is compared with the comparison level $V_D$ determined by the output voltage of the function voltage generating circuit 200 which is indicative of the desired value and the difference between the actual idle rotational speed N and the desired value $N_{ref}$ or $\Delta N$ ($=N-N_{ref}$) is computed, thus generating a signal corresponding to the difference $\Delta N$.

Thus, the comparison circuit 300 generates at the output terminal C of the comparator 304 a signal C which goes to "0" as shown in (c) of FIG. 3 during the time that the output voltage of the D/A conversion circuit 100 remains below the comparison level $V_D$.

An integrator circuit 400 is responsive to the level of the output signal C of the comparison circuit 300 to charge or discharge a capacitor 401 with a constant current and an integrated value E or a control amount is generated in accordance with the difference $\Delta N$. The integrator circuit 400 comprises a constant current charging circuit including resistors 402, 403 and 404 and a transistor 409 and operative in response to the "0" level of the signal C and a constant current discharge circuit including resistors 405, 406 and 407, a diode 408 and a transistor 410 and operative in response to the "1" level of the signal C.

Figure 3:
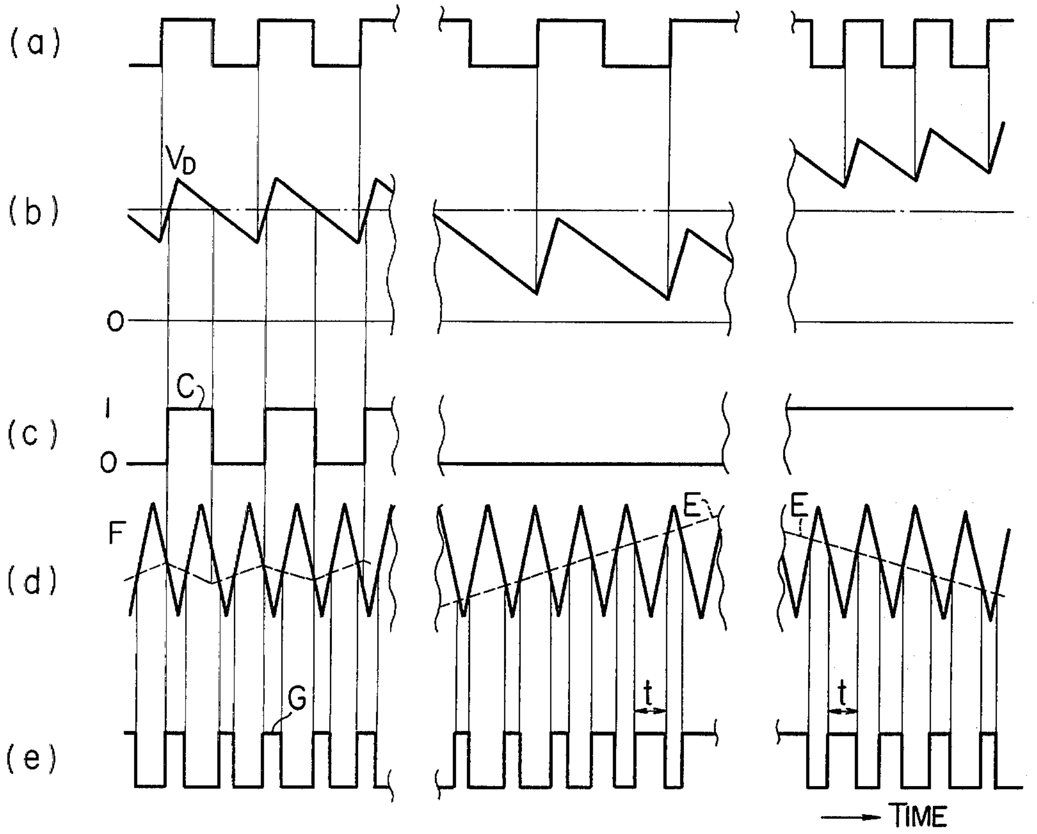
FIG. 3 is a diagram showing the signal waveforms generated at various points in FIG. 2.

The integrator circuit 400 is designed so that so long as the output signal C of the comparison circuit 300 remains at the "0" level, the capacitor 401 is charged with a constant current and the resulting output voltage E increases as shown by the broken line in (d) of FIG. 3, whereas when the output signal C is at the "1" level the capacitor 401 is discharged with a constant current and the output voltage E is decreased as shown by the broken line in (d) of FIG. 3.

A pulse modulator circuit 600 comprises a resistor 601, a comparator 602 and an oscillator 603 and as shown in (d) of FIG. 3 it generates a pulse signal having a duty cycle corresponding to the voltage E which is indicative of the control amount. In this circuit, the oscillator 603 is of the known type which generates a triangular wave voltage F of a predetermined period as shown by the solid line in (d) of FIG. 3.

The comparator 602 receives the output voltage E of the integrator circuit 400 and the triangular wave voltage F from the oscillator 603 and the voltages are compared so as to generate a pulse signal G which goes to the "1" level as shown in (e) of FIG. 3 so far as the output voltage E of the integrator circuit 400 is higher than the voltage F.

An amplifier circuit 700 comprises a power transistor 701 for inverting and amplifying the output signal G of the modulator circuit 600 and the amplified output is supplied to the electromagnetic coil 52 of the electromagnetic valve 51.

A voltage limiting circuit 800 comprises resistors 801, 802 and 803 and diodes 805 and 806 and the output voltage at the terminal E of the integrator circuit 400 is maintained in a control range between an upper limit voltage $V_{max}$ at a terminal H and a lower limit voltage $V_{min}$ at a terminal J.

With the construction described above, when the potential of the capacitor 401 of the integrator circuit 400 increases so that it exceeds the upper limit voltage $V_{max}$, the diode 805 is turned on and consequently the potential of the capacitor 401 is prevented from rising above the upper limit voltage $V_{max}$, whereas when the capacitor potential is decreased, it is prevented from decreasing below the lower limit voltage $V_{min}$, thus limiting the amplitude of the voltage across the capacitor 401.

A limited voltage adjusting circuit 900 comprises resistors 901 and 902 and a transistor 903 and the resistor 901 is connected to the output of the amplifier circuit 201 of the function voltage generating circuit 200 which generates a voltage signal corresponding to the engine warming-up condition. As a result, by suitably selecting the values of the resistors 801, 802 and 803, it is possible to provide a limited voltage range for the upper and lower limit voltages $V_{max}$ and $V_{min}$ which varies in dependence on the engine temperature or the engine warming-up condition as shown in FIG. 5.

Figure 5:
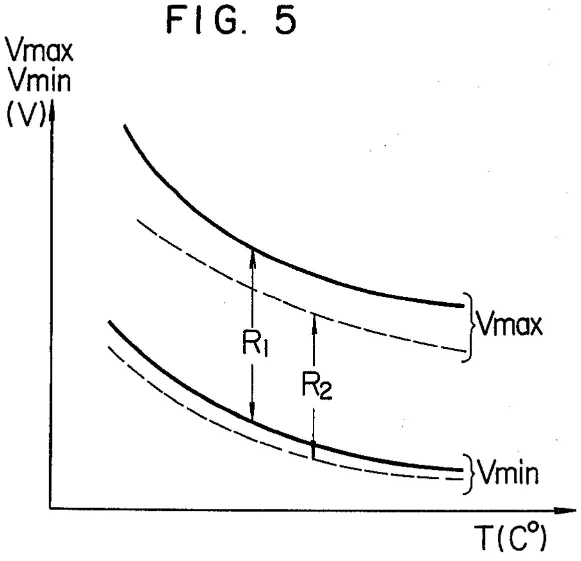

On the other hand, the resistor 902 is connected to the brake switch 25 through the transistor 903 and the resistor 206, so that when the brake switch 25 is turned off, the transistor 903 is turned off and the upper and lower limit voltages $V_{max}$ and $V_{min}$ are respectively changed to a higher level as shown by the solid line in FIG. 5, whereas when the brake switch 25 is turned on so that the transistor 903 is turned on, the upper and lower limit voltages $V_{max}$ and $V_{min}$ are respectively changed to a lower level by a predetermined value as shown by the broken line.

Consequently, when the brake switch 25 is turned off, the control range of the voltage E indicative of the control amount corresponds to the range $R_1$ of FIG. 5, and when the brake switch 25 is turned on the control range corresponds to the range $R_2$ of FIG. 5.

With the construction described above, the operation of the apparatus will now be described. At the idling operation of the engine 10 with the throttle valve 16 of FIG. 1 being closed, when the actual engine idle rotational speed is lower than the desired value (set rotational speed) corresponding to the comparison level $V_D$ determined by the function voltage generating circuit 200 of the air control unit 60 shown in FIG. 2, the output of the D/A conversion circuit 100 also decreases with respect to the comparison level $V_D$. As a result, the output of the D/A conversion circuit 100 is always lower than the comparison level $V_D$ or it is allowed to become higher than the latter only for a short period of time as shown in the central portion of (b) of FIG. 3 and consequently the output signal of the comparison circuit 300 consists of a pulse signal which is always at the "0" level or which has a small duty cycle as shown in the central portion of (c) of FIG. 3. As a result, the output voltage E of the integrator circuit 400 indicative of the control amount rises as shown by the broken line in the central portion of (d) of FIG. 3.

Consequently, in the pulse modulator cicuit 600, the length of time t that the integrated voltage E becomes higher than the triangular wave voltage F of the oscillator 603 (or the time interval during which the output of the comparator 602 goes to the "1" level) is increased and the duty cycle is increased. Thus, the duration of energization period of the electromagnetic coil 52 of the electromagnetic valve 51 is increased, that is, the opening of the air control valve 30 is increased so that the amount of secondary air bypassing the throttle valve 16 is also increased and the amount of air supplied to the engine 10 is increased, increasing the amount of fuel and hence the amount of mixture and thereby increasing the rotational speed of the engine 10.

On the contrary, when the engine rotational speed is higher than the desired value (the set rotational speed), the output of the D/A conversion circuit 100 always becomes higher than the comparison level $V_D$ which provides the desired value as shown in the right portion of (b) of FIG. 3 or it is allowed to become lower than the latter only for a short time and consequently the output signal of the comparison circuit 300 consists of a pulse signal which always is at the "1" level as shown in the right portion of (c) of FIG. 3 or which has a large duty cycle. As a result, the output voltage E of the integrator circuit 400 is decreased as shown by the broken line in the right portion of (d) of FIG. 3.

When this occurs, in the pulse modulator circuit 600, the length of time t that the integrated voltage E becomes higher than the triangular wave voltage F of the oscillator 603 (or the time period during which the output of the comparator 602 goes to the "1" level) is decreased so that the length of energization period of the electromagnetic coil 52 of the electromagnetic valve 51 for the air control valve 30 is decreased, that is, the opening of the air control valve 30 is decreased and the amount of secondary air bypassing the throttle valve 16 is decreased. As a result, the amount of air supply as well as the amount of fuel supply to the engine 10 are decreased so that the amount of mixture is decreased and the rotational speed of the engine 10 is decreased.

In this way, at idling operation with the throttle valve 16 being closed, the engine rotational speed is controlled by the air control unit 60 at the desired value (the set rotational speed) corresponding to the comparison value $V_D$ which is determined by the output of the function voltage generating circuit 200. Since the output terminal of the amplifier circuit 201 is connected to the input terminal D of the comparator 304 through the resistor 202 and the diode 203, the comparison level $V_D$ determining the desired value is increased with a decrease in the engine temperature in response to the output of the warm-up sensor 22 as shown by the solid line in FIG. 4 and consequently at the warming-up operation the rotational speed is increased with the engine temperature so as to maintain the stable idle operation. On the other hand, when the air conditioner switch 23 is turned on so that the compressor 28 of the car cooler, for example, is connected to and driven from the engine 10, the On signal from the air conditioner switch 23 is applied to the functional voltage generating circuit 200 with the result that the comparison level $V_D$ is raised as shown by the broken line in FIG. 4 and the desired value is changed to the higher level, thus eliminating such problem as the deteriorated cooling capacity of the vehicle or the stalling of the engine.

On the other hand, as mentioned previously, when the engine temperature for example rises so that the warming-up period is terminated, the engine load such as the viscosity resistance of the engine oil is decreased and only a reduced amount of secondary air is required in this condition. Thus, in case of the completion of warming-up period, for example, if the foot is raised from the accelerator pedal and the brake pedal is depressed to decelerate and stop the vehicle, the throttle valve 16 is closed and the air control unit 60 performs the closed loop control of the rotational speed. In the case of the prior art apparatus, as mentioned previously, if the brakes are applied continuously until the engine rotational speed becomes lower than the desired value determined by the function voltage generating circuit 200, the output of the integrator circuit 400 increases continuously, that is, the opening of the air control valve 30 is increased and the amount of secondary air is increased at a stretch, giving rise to the possibility of abnormally increasing the engine rotational speed, although this occurs only for a time.

In accordance with the invention, since the voltage limiting circuit 800 limits the output of the integrator circuit 400 to the upper limit voltage $V_{max}$ and since the upper limit voltage $V_{max}$ is set to a lower value when the foot brake 26 is applied and the brake switch 25 is turned on, the amount of secondary air is prevented from exceeding an amount which is determined by the upper limit voltage $V_{max}$ and the engine rotational speed is prevented from increasing abnormally.

In the case of the prior art apparatus, as mentioned previously, even when the vehicle is run at a very low speed with the accelerator pedal not being practically depressed, due to the closed loop control of the engine rotational speed by the air control unit 60, the vehicle speed is always limited to a speed corresponding to the desired rotational speed determined by the function voltage generating circuit 200. As a result, when the driver desires to drive the vehicle at a lower speed, the control will be performed against the will of the driver. In accordance with this invention, however, when the brake pedal 26 is depressed, the transistor 208 is turned on so that the comparison level $V_D$ is decreased and the desired value (the set rotational speed) is decreased, thus making the vehicle speed controllable according to the will of the driver.

On the other hand, by virtue of the fact that the output of the integrator circuit 400 is limited by the voltage limiting circuit 800 to come within the upper and lower limits, even in case of failure for example of the rotational speed signal from the rotational speed sensor, at least at the idling operation the rotational speed can be controlled to come within a control range corresponding to the voltage within the upper and lower limits determined by the engine temperature.

While, in the embodiment described above, the computer 17 comprises an analog computer of the wired-logic type, the control may be performed by means of a microcomputer of the stored program type.

Figure 6:
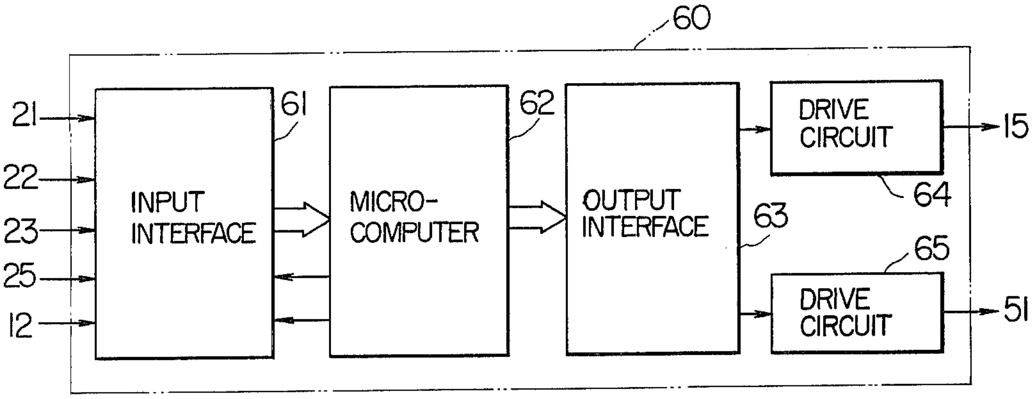
FIG. 6 is a block diagram showing another embodiment of the invention.
Figure 7:
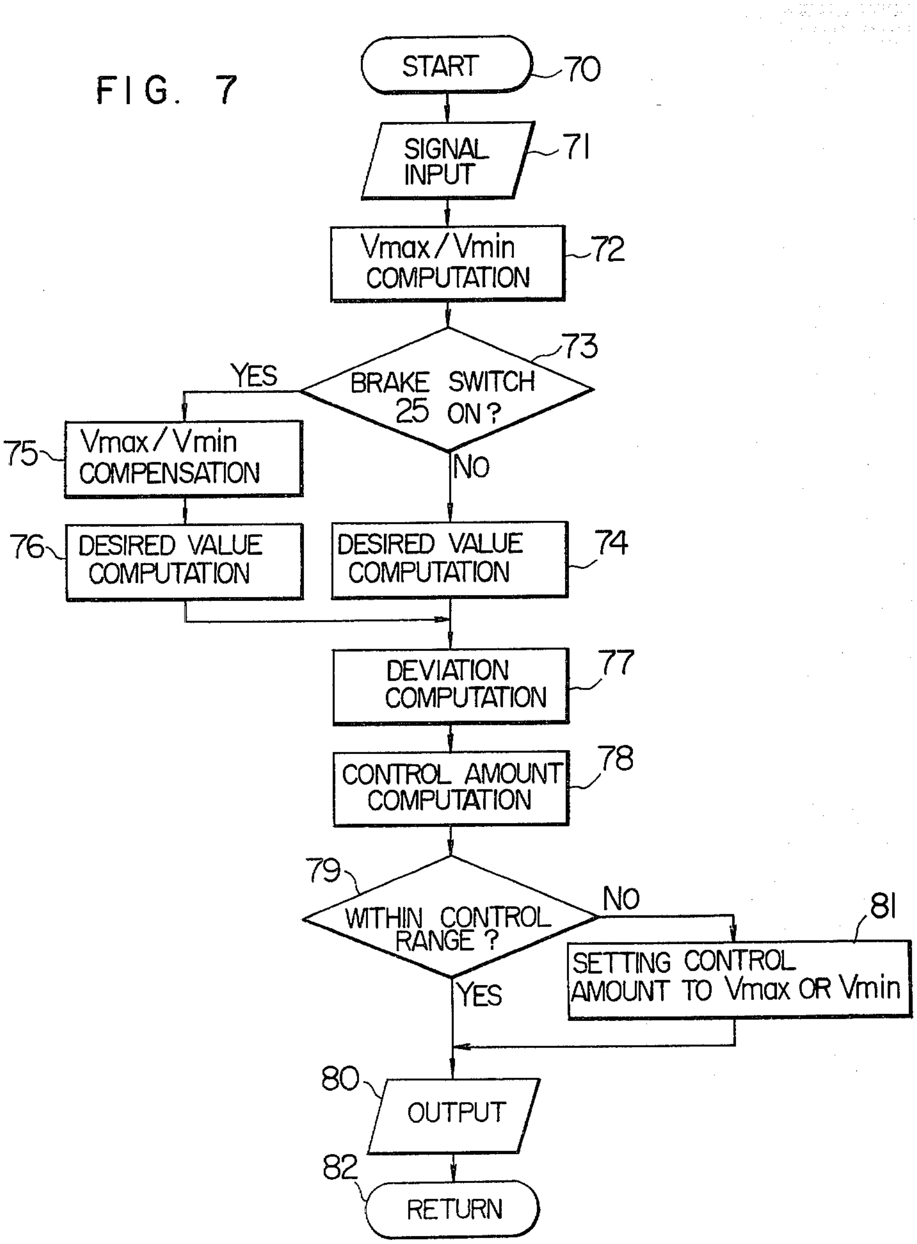
FIG. 7 is a flow chart useful for explaining the operation of the invention.

In this case, it is only necessary to use a computer 60 comprising, as shown in FIG. 6, an input interface 61, a microcomputer 62, an output interface 63 and drive circuits 64 and 65, whereby the central processing unit of the microcomputer 62 is requested to produce an interrupt at intervals of 20 ms, for example, so as to perform such an interrupt routine as shown in FIG. 7.

In FIG. 7, the interrupt routine is started by a step 70 and a step 71 introduces the output signals of the sensors and switches 21 to 25. The next step 72 computes the upper or lower limit value $V_{max}$ or $V_{min}$ of the control amount from the output signal of the warm-up sensor 22.

The next step 73 determines whether the brake switch 25 has been turned on. If it is not, a step 74 computes the desired speed for the idle rotational speed in accordance with the signals from the warm-up sensor 22 and the air conditioner switch 23. If it is, a step 75 performs a corrective computation so as to decrease the upper or lower limit value $V_{max}$ or $V_{min}$ and the next step 76 computes the desired value for the idle rotational speed in accordance with the signals from the warm-up sensor 22 and the air conditioner switch 23 while using the braking condition as a parameter.

The next step 77 computes a deviation ΔN from the following equation in accordance with the actual idle rotational speed N and the desired value $N_{ref}$ $$\Delta N = N - N_{ref}$$

The next step 78 computes as a control amount a value which is indicative of the duty cycle in accordance with the deviation ΔN. Then, a step 79 determines whether the control amount is within the control range between the previously computed upper and lower limit values $V_{max}$ and $V_{min}$ so that if it is, the next step 80 delivers the control amount to the output interface 63.

If the control amount is not within the control range, control is transferred to a step 81 which sets the control amount to $V_{max}$ if it is greater than the latter or sets the control amount to $V_{min}$ if it is smaller than the latter and the step 80 outputs the thus set control amount.

Then, a step 82 returns the control to the main routine. In this way, the control amount computed by the microcomputer 62 and indicative of the desired duty cycle is delivered to the output interface 63 so that the control amount is converted to a pulse signal having this duty cycle and the pulse signal is applied to the electromagnetic valve 51 through the drive circuit 65.

Thus, the same controls as the previously mentioned computer of the wired-logic type are performed.

While, in the embodiments described above, the amount of secondary air bypassing the throttle valve 16 is controlled by means of the air control valve 30, as for example, the opening of the throttle valve 16 may be controlled in response to the displacement of the shaft 34 of the air control valve 30 so as to control the amount of the air supplied during the period of idle operation.

Further, while, in the above-described embodiments, the air control valve is of the type in which the diaphragm valve is actuated by means of the electromagnetic valve 51, it is possible to use an air control valve of the electromagnetic type using a linear solenoid or linear motor for directly actuating the valve member by means of an electromagnetic force.

Still further, while the warm-up sensor comprises a cooling water temperature sensor, it is possible to use an engine oil temperature sensor, engine-block temperature sensor, timer comprising a bimetal electric heater or the like.

Still further, while the engine warming-up condition and the engagement of the compressor are used as the factors for generating a function voltage, it is possible to use other engine operating conditions for generating a function voltage.

We claim:

1. In an automotive vehicle driven by an internal combustion engine and having brakes, said engine including throttle means capable of supplying said engine with primary air, bypass means capable of supplying said engine with secondary air independently of said throttle means, and fuel supply means capable of supplying said engine with fuel in accordance with the amount of primary and secondary air supplied to said engine, a method of controlling the idle rotational speed of said engine comprising the steps of:

sensing (a) the actual rotational speed of said engine, (b) a temperature of said engine and (c) the activation and deactivation of said brakes;

establishing a predetermined idle rotational speed of said engine and upper and lower limits for the amount of said secondary air that can be supplied to said engine by said bypass means, said predetermined idle rotational speed being a function of engine temperature and brake activation, the function requiring a decrease in predetermined idle rotational speed for an increase in said sensed temperature and for a sensed activation of said brakes, and at least said upper limit of the amount of secondary air being a function of brake activation, the function requiring a decrease of said upper limit with said sensed activation of said brakes;

determining a predetermined amount of said secondary air in accordance with the difference between said sensed rotational speed and said established predetermined idle rotational speed, said predetermined amount of secondary air being limited to said upper limit when said sensed rotational speed is above said predetermined idle rotational speed, and said predetermined amount of secondary air being limited to said lower limit when said sensed rotational speed is below said predetermined idle rotational speed; and controlling said bypass means so that said predetermined amount of secondary air is supplied to said engine through said bypass means.

2. In an automotive vehicle driven by an internal combustion engine and having brakes, said engine including mixture supply means capable of supplying said engine with an air-fuel mixture, an apparatus for controlling the idle rotational speed of said engine comprising:

speed sensor means for sensing the actual rotational speed of said engine;

temperature sensor means for sensing the temperature of said engine;

brake sensor means for sensing the activation and deactivation of said brakes;

reference means for establishing a predetermined idle rotational speed of said engine, said predetermined idle rotational speed being a function of engine temperature and brake activation, the function requiring a decrease in predetermined idle rotational speed for an increase in said sensed temperature of said combustion engine and for a sensed activation of said brakes;

comparison means for comparing said sensed actual rotational speed with said desired idle rotational speed established by said reference means;

computing means for determining a computed control value in accordance with an output of said comparison means;

limiting means for limiting said computed control value within a range between an upper limit and a lower limit, said limiting means varying at least said upper limit so that said upper limit has a first value when said brakes are activated and a second value higher than said first value, when said brakes are deactivated; and control means for controlling said mixture supply means in response to said control value limited between said upper and lower limits so that the actual rotational speed of said engine is adjusted so as to maintain said predetermined idle rotational speed.

3. In a method of controlling the idle rotational speed of an internal combustion engine which drives an automotive vehicle comprising the steps of (a) computing a desired idle rotational speed of said engine, (b) sensing an actual rotational speed of said engine, (c) computing a difference between said actual rotational speed and said predetermined idle rotational speed, and (d) computing a control amount to control an amount of an air-fuel mixture supplied to said engine, the improvement comprising the steps of:

establishing upper and lower limits of the control amount; and changing the upper and lower limits and the predetermined idle rotational speed upon activation of brakes of said automotive vehicle.

4. In a method of controlling the idle rotational speed of an internal combustion engine which drives an automotive vehicle comprising the steps of (a) computing a predetermined idle rotational speed of said engine, (b) sensing an actual rotational speed of said engine, (c) computing a difference between said actual rotational speed and said predetermined idle rotational speed, and (d) computing a control amount for controlling an amount of an air-fuel mixture supplied to said engine, the improvement comprising the steps of:

establishing upper and lower limits of the control amount;

changing at least the upper limit of the control amount to a lower value thereof upon activation of brakes of said automotive vehicle than a value employed when said brakes are not activated;

changing said predetermined idle rotational speed in accordance with the control amount limited within a range between said upper and lower limits.

* * * * *